United States Patent Office 3,131,169
Patented Apr. 28, 1964

3,131,169
POLYMERIZATION PROCESS
Charles J. Norton, Denver, Colo., and Paul N. Rylander, Newark, N.J., assignors to Standard Oil Company, Chicago, Ill., a corporation of Indiana
No Drawing. Filed Nov. 13, 1961, Ser. No. 152,090
12 Claims. (Cl. 260—88.2)

This invention relates to novel homopolymers and interpolymers of 1,1-dicyclopropylethene and methods for producing the same.

Hitherto it has been known to prepare resinous polymers of olefinic compounds having a cyclopropyl substituent. Thus, Jones U.S. 2,540,949 and U.S. 2,540,950 has described certain polymers and copolymers of vinyl cyclopropane and of alkyl substituted vinyl cyclopropane. These polymers were prepared by conventional polymerization processes employing Friedel-Crafts or peroxide-type catalysts. More recently, the polymerization of vinyl cyclopropane by means of heterogeneous catalysts of the Ziegler type has been described by Overberger et al., J. Poly. Sci., vol. XLIV, pp. 491–504 (1960).

The present invention is concerned with the preparation of novel resinous materials by the homopolymerization or interpolymeriaztion of 1,1-dicyclopropylethene, which may be depicted by the following structural formula

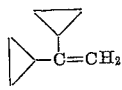

Surprisingly, we have found that this novel monomer is capable of conversion by polymerization to high molecular weight, useful polymeric materials which retain the cyclopropyl rings intact, thus providing novel polymers having structural units

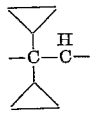

incorporated in the polymeric chain. Such polymers and copolymers of 1,1-dicyclopropylethene are extremely useful in that they may be treated with chemical reagents capable of reacting with the cyclopropyl ring to yield polymeric materials having a variety of chemically bound side chains. Thus, the polymers of this invention can be treated with hydrogen bromide, then with an amine or ammonia, and then neutralized to yield polymers or copolymers containing amino groups. Such polymeric substances are useful, e.g. as combination VI improvers and detergents for motor oils.

The reaction of 1,1-dicyclopropylethene to produce polymeric materials of high molecular weight can be effected by any one of a number of methods known per se to the art. For example, 1,1-dicyclopropylethene can be polymerized by means of acid-reacting catalysts of the Friedel-Crafts type. In effecting such reactions, polymerization is generally conducted at temperatures between about −100° C. and 100° C., preferably at room temperature or below, in an inert reaction medium which serves as a solvent for the catalyst. Suitable reaction media which have been employed for this purpose are benzene, toluene, xylene, solvent naphtha, petroleum naphtha, carbon tetrachloride, ethylene dichloride, simple alkane hydrocarbons such as ethane, propane, hexane, etc. Among the catalysts which can be employed are the acid-acting metallic halides, e.g. aluminum chloride, aluminum bromide, titanium tetrachloride, stannous chloride, zinc chloride, boron trifluoride, ferric chloride, or known organo-solvent complexes of these metallic halides. Generally, polymerization is effected in the presence of from 0.1% to about 10% by weight of such metal halide catalysts based on the weight of monomeric reactant, and polymerization effected over a period of time sufficient to convert all of the reactant to polymer, usually from about one hour to about 24 hours being sufficient. At the conclusion of the polymerization reaction, the catalyst can be destroyed by addition of ammonia, alcohol, ether or the like, and the polymeric product recovered.

The use of acid-reacting catalysts of the Friedel-Crafts type permits of the preparation of copolymers of 1,1-dicyclopropylethene with tertiary olefins having from 4 to 10 carbon atoms in the molecule, such as isobutylene, 2-methylpentene-1, 2-ethylpentene-1, 2-methylhexene-1, and the like. Such comonomers conform to the general structural formula $R_2C=CR'_2$ where each R is an alkyl group and each R' is hydrogen or any alkyl group. In preparing copolymers of this type, it is preferable to employ from about 1 to 200 mols, preferably between about 10 and 100 mols, of tertiary olefin per mol of 1,1-dicyclopropylethene.

We have further found that the polymerization or interpolymerization of 1,1-dicyclopropylethene is not limited to the use of acid-reacting catalysts, but that this monomer can be effectively polymerized with peroxide-type catalysts, in bulk or aqueous reaction medium, in a manner well known to the art for the polymerization of styrene. The use of peroxide catalysts is particularly effective in the preparation of copolymers of 1,1-dicyclopropylethene with monomers such as styrene, vinyl naphthalene, vinyl toluene, vinyl chlorobenzene, low-boiling conjugated diolefins such as 1,3-butadiene, isoprene, chloroprene, etc. Copolymers containing from 0.1 to 10 parts 1,1-dicyclopropylethene per part of comonomeric material are readily prepared by carrying out the polymerization in aqueous emulsion under conditions similar to those well known in the art.

In such peroxide promoted polymerizations, it is preferred to employ reaction temperatures between about 50 and 100° C., using catalysts having oxidizing characteristics such as have been previously used for the production of polystyrene. Among such catalysts are the organic peroxides including materials such as benzoyl peroxide, potassium persulfate, tert-butyl hydroperoxide or an azo compound such as alpha, alpha'-azodiisobutyronitrile. Usually, it is desirable to use a catalyst which is soluble in the polymerization medium. Thus, in an aqueous medium, hydrogen peroxide, sodium percarbonate, sodium perborate or the other alkali metal salts of a peroxy acid may be used. In a non-aqueous system, peroxides such as benzoyl peroxide, acetyl peroxide or other organic peroxidic compounds may be required.

The polymerization or interpolymerization of 1,1-dicyclopropylethene can be effected not only with the acid-reacting catalysts and peroxide-type catalysts hitherto mentioned, but equally well with heterogeneous catalysts of the so-called Ziegler type. These actalysts essentially comprise salt-like compounds of groups IV$a$–VI$a$ of the periodic system, together with metals, metal hydrides or metallo-organic compounds of groups I, II or III of the periodic table. Typical catalysts of this type include titanium halides such as titanium tetrachloride, titanium trichloride, vanadium chloride, vanadium oxychloride, etc. together with metal alkyls such as the aluminum alkyls, e.g. aluminum triethyl, aluminum sesquihalides, and the like, metal hydrides, etc. The art concerning these catalysts is now highly developed and need not be reproduced here in detail. It is known, for example, that polymerization with these catalysts must be effected under anhydrous conditions, generally in inert hydrocarbon reaction media, and at temperatures of about room temperature to 120° C. Such known reaction conditions can be employed in accordance with the present invention, to produce the novel polymers of this invention.

PREPARATION OF DICYCLOPROPYLMETHYL-CARBINOL

A solution of methylmagnesium iodide in ether was prepared from 84 g. (3.5 moles) magnesium turnings, 497 g. (3.5 moles) methyl iodide and 1.1 of anhydrous ether. The Grignard reagent was cooled in an ice bath and a solution of 330 g. (3 moles) dicyclopropylketone in 300 ml. ether was added over a period of one hour. The mixture was stirred overnight at room temperature. The addition complex was then cooled in an ice bath and 600 ml. cold water was slowly added. (Water is the only safe reagent to use for hydrolysis because acids and even $NH_4Cl$ cause alcohols of this type to rearrange.) The clear ether solution was decanted from the magnesium salt. The salt was extracted several times with ether. The combined extracts and ether solution were dried over Drierite. After the ether was removed, the product was distilled in vacuo. There was obtained 270 g. (72% yield) of dicyclopropylmethylcarbinol (3), boiling point 56–57° C./10 mm., $n_D^{20}$ 1.4629.

PREPARATION OF 1,1-DICYCLOPROPYLETHENE

To 200 g. of dicyclopropylmethylcarbinol cooled in an ice bath was slowly added with stirring 100 drops of concentrated $H_2SO_4$. The mixture was slowly distilled at 10 mm. pressure. A mixture of $H_2O$ plus organic material which distilled over between 40° and 70° C. was collected. The organic layer was dried over anhydrous $MgSO_4$, and distilled in vacuo. There was obtained 132 g. of dicyclopropylethene, boiling point 47–48° C./33 mm., $n_D^{20}$ 1.4652.

*Analysis.*—Calc. for $C_8H_{12}$: C, 88.9; H, 11.1. Found: C, 88.7; H, 11.5.

Oxidation of some of the olefin with neutral aqueous $KMnO_4$ yielded dicyclopropylketone, which was identified by comparison of the infrared spectra and physical properties of the oxidation product with authetic dicyclopropylketone.

Example 1

A 50 ml. round-bottom flask equipped with magnetic stirrer was charged with 10 ml. n-heptane, 10 ml. 1,1-dicyclopropylethene, and 2 ml. 1.2 molar $Al(i-C_4H_9)_3$ in heptane. Two ml. of a heptane solution 0.3 molar in $TiCl_4$ was slowly added with stirring over a period of several minutes. Heat was evolved and the mixture became quite viscous and gelled shortly after the last of the $TiCl_4$ had been added. The mixture was allowed to stand overnight and then mixed with 50 ml. $CH_3OH$ to yield a grayish-white doughy polymer. The polymer was washed several times with $CH_3OH$ and boiled with 150 ml. xylene and filtered hot. The material on the filter was practically transparent and swelled when placed in xylene. When this translucent polymer was treated with $CH_3OH$, the polymer shrunk somewhat and became pale yellow in color; however, none of the common solvents would dissolve this polymer. This insoluble polymer was dried in vacuo (10–20 mm.) at 70–80° C. for 16 hours. The dried polymer was hard and somewhat brittle and weighed about 7 g. The infrared spectrum showed the presence of cyclopropyl groups.

The xylene filtrate from the original work-up was concentrated by evaporation, cooled, and poured into $CH_3OH$ whereupon a gummy, pale yellow polymer precipitated. The solvent was decanted and the polymer was washed with several portions of $CH_3OH$. This treatment made the polymer much firmer. The polymer was dried in vacuo (10–20 mm.) at 70–80° C. for 16 hours. The dried hard polymer weighed 2 g. Infrared data showed that this polymer contained cyclopropyl groups.

X-ray data indicated that both of these polymers were non-crystalline.

Example 2

A 50 ml. round-bottom flask was charged with 7 ml. n-heptane and 5 ml. 1,1-dicyclopropylethene. One ml. of 0.3 molar $TiCl_4$ in heptane was added dropwise to the olefin solution. The mixture was stirred over night at room temperature and then poured into 100 ml. $CH_3OH$, whereupon a white gummy polymer precipitated. The polymer was dissolved in boiling xylene. The solution was filtered hot and filtrate was concentrated, cooled, and poured into $CH_3OH$, whereupon a gummy polymer precipitated. The polymer was washed several times with $CH_3OH$ and dried at 80° C. and 15 mm. pressure for 16 hours. The infrared spectrum of the polymer showed strong cyclopropane absorption indicating that the cyclopropane ring remained intact during the polymerization.

Example 3

500 ml. 3-neck, round-bottom flask equipped with stirrer, condenser, and thermometer and cooled in a Dry-Ice bath was charged with 95 ml. condenser isobutylene and 3 g. 1,1-dicyclopropylethene. The temperature was maintained at −50° to −40° F. while a solution of 6 ml. $TiCl_4$ in 15 ml. pentane was added in 2 ml. portions. After about 15 minutes, the mixture was extremely viscous. The doughy mass was transferred to a beaker containing 400 ml. $CH_3OH$, whereupon a white gummy polymer developed. The copolymer was dissolved in hot hexane and reprecipitated by pouring the hexane solution into $CH_3OH$. The copolymer was then washed with $CH_3OH$ and dried in a vacuum oven at 75° C. for 12 hours. Comparison of the infrared spectra of the copolymer and pure polyisobutylene showed that the two were different and the copolymer spectrum showed the presence of the cyclopropyl group. The viscosity index of WNSX–5W motor oil was increased from 81 to 135 by adding 1% by weight of the copolymer to the oil.

Example 4

A Fisher-Porter tube was charged with 20 g. benzene, 2 g. 1,1-dicyclopropylethene, 18 g. freshly distilled styrene, and 0.2 g. benzoyl peroxide. The tube was sealed and heated at 90–100° C. for 22 hours. The mixture was cooled and poured into 300 ml. $CH_3OH$, whereupon a white gummy polymer precipitated. The copolymer was dissolved in hot benzene and reprecipitated by pouring into $CH_3OH$. The copolymer which was dried in a vacuum oven at 75° C. for 18 hours had the appearance of polystyrene.

The polymers and interpolymers of the present invention are high molecular weight, resinous materials having utility for the fabrication of molded, extruded or cast articles, and for the formation of film. They may be fabricated into articles for which conventional polymers such as polyethylene and polystyrene have hitherto been employed. The polymers and interpolymers may be blended with other thermoplastic polymers; or compounded with fillers, foaming agents and the like to serve particular applications. The polymers and interpolymers of 1,1-dicyclopropylethene are particularly valuable since the three membered rings thereof provide points of chemical reaction by which a wide variety of substituted linear polymers can be prepared. Thus, the cyclopropyl polymers can be treated with acidic materials to isomerize the three-membered ring to a propenyl or isopropenyl group. This olefinic group may then be further modified with chemical reagents to introduce various functional groups or may be further polymerized or copolymerized to give a higher molecular weight polymer—linear or cross-linked.

Having described our invention, what we claim is:
1. Poly-(1,1-dicyclopropylethene).
2. As a new composition of matter, an interpolymer of 1,1-dicyclopropylethene and a tertiary olefin having the formula $R_2C=CR'_2$ wherein each R is an alkyl group and each R' is selected from the group consisting of hydrogen and alkyl, said olefin having from 4 to 10 carbon atoms in the molecule.

3. As a new composition of matter, an interpolymer of 1,1-dicyclopropylethene and isobutylene.

4. As a new composition of matter, an interpolymer of 1,1-dicyclopropylethene and styrene.

5. A process for producing high molecular weight materials which comprises polymerizing 1,1-dicyclopropylethene in the presence of a Friedel-Crafts catalyst in an inert liquid reaction medium.

6. A process for producing high molecular weight materials which comprises interpolymerizing 1,1-dicyclopropylethene and an olefin of from 4 to 10 carbon atoms having the structural formula $R_2C=CR'_2$ wherein each R is an alkyl group and each R' is selected from the group consisting of hydrogen and alkyl in the presence of a Friedel-Crafts catalyst in an inert liquid reaction medium.

7. The process of claim 6 wherein said olefin is isobutylene.

8. The process of claim 6 wherein said Friedel-Crafts catalyst is $TiCl_4$.

9. A process for producing high molecular weight materials which comprises polymerizing 1,1-dicyclopropylethene in the presence of a peroxide polymerization catalyst.

10. The process of claim 9 wherein said polymerization is effected in the presence of styrene.

11. A process for producing high molecular weight materials which comprises polymerizing 1,1-dicyclopropylethene in the presence of a catalyst comprising a salt-like compound of a metal of groups IVa, Va, and VIa with a member of the group consisting of groups I, II and III metals, metal hydrides and metallo-organic compounds.

12. The process of claim 11 wherein the catalyst is $TiCl_4$ and aluminum triisobutyl.

No references cited.